May 7, 1940.                W. L. DAWSON                2,199,559
                          SOUND PICTURE FILM
                         Filed April 7, 1938
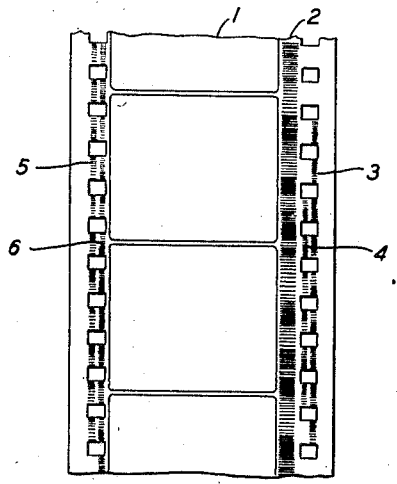
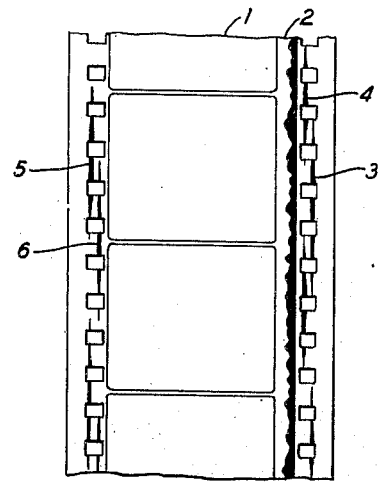
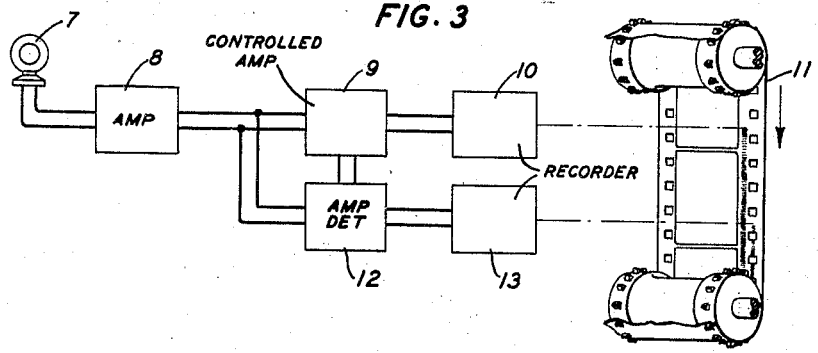
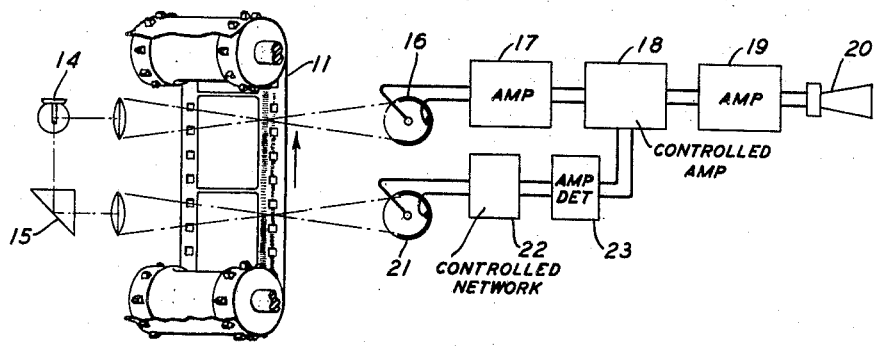
INVENTOR
W. L. DAWSON
BY
G. H. Heydt
ATTORNEY Patented May 7, 1940

2,199,559

UNITED STATES PATENT OFFICE 2,199,559

SOUND PICTURE FILM

Wilfrid L. Dawson, New York, N. Y., assignor to Bell Telephone Laboratories, Incorporated, New York, N. Y., a corporation of New York Application April 7, 1938, Serial No. 200,661
In Great Britain October 6, 1937

3 Claims. (Cl. 179—100.3)

This invention relates to film sound recording systems in which one or more volume control records are provided in addition to the main sound record.

The object of the invention is the provision of one or more volume control records on a standard sound picture film without reducing the area of the picture, or the width of the film commonly used for the sound track.

A feature of the invention is the provision of one or more volume control records placed between the sprocket holes of the film.

In many known sound recording systems a control record is provided on the film to control the volume of the reproduced sound. In the usual sound and picture film, the amount of space available for a control record is restricted, as most of the available space is required for the picture and the sound track. It is generally not practical to reduce the size of the picture or the width of the sound track in order to accommodate the control record. For this reason the sound and picture films generally used in theatres have not been provided with any control records. As a result, the reproducing systems which involve the use of an auxiliary control record have not gone into general use.

According to the present invention, the control record is arranged to extend along the line of sprocket holes at the side of the film, so as to occupy the spaces between successive sprocket holes. The control record is preferably provided at the side of the film which bears the sound track, but if desired, one or more control records may be provided between the sprocket holes on both sides of the film, one or all of the control records being utilized during the reproduction of the sound.

In the drawing:

Fig. 1 shows a variable density film sound record having variable density control records between the sprocket holes;

Fig. 2 shows a variable area film sound record having variable area control records between the sprocket holes;

Fig. 3 diagrammatically shows a film sound recording system in accordance with the present invention; and Fig. 4 diagrammatically shows a film sound reproducing system in accordance with the present invention.

The film in Fig. 1 has a sequence of pictures 1 and a variable density sound record 2 located in the usual manner between the two rows of sprocket holes. Between the sprocket holes on one or both sides of the film are one or more variable density control records 3, 4, 5 and 6.

Similarly, the film in Fig. 2 has a sequence of pictures 1 and a variable area sound record 2 in the usual location between the sprocket holes. Located between the sprocket holes on one or both sides of the film are one or more variable area control records 3, 4, 5 and 6. Although variable density control records have been shown associated with a variable density sound record and variable area control records have been shown associated with a variable area sound record, it will be understood that the invention is in no way limited to this particular arrangement, and that the variable area control records may be associated with variable density sound records, or vice versa, or a variable area record may be used between one row of socket holes and a variable density record between the other row of socket holes on the same film.

In the recording system shown in Fig. 3, which is generally similar to the system shown in U. S. Patent 1,623,756, April 5, 1927, C. F. Sacia, acoustic waves are detected by the microphone 7, amplified by the amplifier 8 and transmitted through the controlled amplifier 9 to the recorder 10 which produces a sound record in the usual position on the film 11. The sound record may be a single record, a multiple stereophonic record, a push-pull record or any other suitable type of record. A portion of the output of the amplifier 8 is passed through an amplifier detector 12 to the recorder 13 which produces a control record between the sprocket holes of the film 11. A portion of the output of the amplifier detector 12 controls the amplification or transmission in the controlled amplifier 9 so as to partially or fully compress the range of amplitudes of the currents supplied to recorder 10. The controlled records may also be produced manually as shown in U. S. Patent 1,446,246, February 20, 1923, L. De Forest. In manual control systems, the light valve or shutter which records the control record may be operated by means of an auxiliary potentiometer in the signal current circuit. This may be arranged so that no control track will be recorded when there is no volume compression in the main record. When abnormal sound levels are anticipated the attenuation of the potentiometer may be varied to reduce the amplitude of the current supplied to the recorder 10 and simultaneously a control track may be recorded of corresponding width or density. It may be desirable to have the portion of the control record corresponding to a given point on the main sound record located on the film ahead of this point on the main sound record in order to compensate for the time of operation of the expanding device in the reproducing circuit.

In Fig. 4 light from the source 14 is projected through the sound record on the film 11 and a portion of the light deflected by the prism 15 is projected through the control record on the film 11. The light transmitted through the sound record on the film 11 is detected by the photoelectric cell 16 and the sound modulated current amplified in the amplifiers 17, 18 and 19 and reproduced by the sound reproducer 20. The light transmitted through the control record on the film 11 is detected by the photoelectric cell 21 and the sound modulated current may pass through a controlling network 22 to an amplifier detector 23. The output of the amplifier detector 23 controls the amplification or transmission of the amplifier 18 to expand the volume range of the reproduced sounds to their original value before the currents are supplied to the reproducer 20.

The control of the sound reproducing apparatus by the volume control record, in which the recorded fluctuations corresponding to volume changes are of relatively low periodicity as compared with the periodicity of the recorded sound currents in the main sound record, may be so effected, if desired, by the use of appropriate electrical filters in the controlling network, that the presence of the sprocket holes which pass through the light medium for the control record at a constant speed of usually ninety-six sprocket holes per second, does not deleteriously affect the quality of the reproduced sound. These filters may be designed in accordance with the teaching of U. S. Patent 1,768,288, June 24, 1930, F. Mohr, with appropriate changes to adapt the filters for the slightly different conditions. The light beam used in reproducing the control record preferably has a greater height lengthwise of the film than that normally used for the reproduction of a sound record and may, in fact, be high enough to cover the full height of a sprocket hole, or more, if desired. In place of a filter in the control network 22 a voltage limiting device may be used to limit the maximum voltage applied to the amplifier detector 23.

When recording the compression applied to a signal modulating current, the changes in the control record occur rather slowly, and if the volume of the sounds being recorded remains constant for any length of time the control record will be unchanged during that time. Thus, in a system as shown in U. S. Patent 1,623,756, the current reproduced from the control record has the characteristic of a slowly varying pulsating current and thus requires an amplifier detector capable of amplifying currents of very low frequencies. Such amplifiers are difficult to construct and are notoriously unstable. In the present invention the sprocket holes act as a light chopper producing a regular interruption of the reproduced currents at a frequency of ninety-six cycles per second so that the current supplied to the amplifier detector has the characteristic of a ninety-six cycle carrier current modulated in accordance with the changes in volume of the sounds. By suitable choice of the width of the scanning beam and the control network, the control current may be made nearly sinusoidal. Such a current may be easily amplified in a conventional alternating current amplifier.

The present invention enables the currents reproduced from the sound record to be adapted to the requirements of theatres of various sizes. For example, the sounds may be recorded with a moderate degree of compression so that the contrast in the sounds is about the same as now used, a control record made of the degree of compression applied to the recorded signal currents, and a separate control record of the location of the source of sound also placed on the record. In the smaller theatres the sound record only may be reproduced and will give a quality of sound and a range of volume comparable with the present method of reproduction. In the larger theatres the sound record and the control record may be reproduced and the volume range of the reproduced signal currents expanded so as to produce a much wider range of volume in the reproduced sound than is now possible. In the more elaborate theatres, in addition to an expansion of the range of volume of the reproduced sound, another control record may operate upon the reproducing channel or channels so as to produce a stereophonic effect in the reproduction of the sound.

What is claimed is:

1. The method of reproducing a sound film having a sound record on said film, and a control record within the strip of film occupied by the sprocket perforations which comprises reproducing said sound record as a sound current, amplifying and reproducing said current, scanning said control record with a beam of light, exciting a photosensitive device with the light modulated by said control record to produce a control current, modifying the wave form of said control current to approximately sinusoidal form, amplifying and detecting said modified current, and controlling the transmission of said sound current by the products of said detection.

2. The method of reproducing a sound film having a sound record on said film and a control record within the strip of film occupied by the sprocket perforations which comprises reproducing said sound record as a sound current, amplifying and reproducing said current, scanning said control record with a beam of light, exciting a photosensitive device with the light modulated by said control record to produce a control current, limiting the maximum amplitude of said control current, amplifying and detecting said control current and controlling the transmission of said sound current by the products of said detection.

3. The method of reproducing a film having a sound record thereon and a control record within the strip of film occupied by the sprocket perforations which comprises reproducing said sound record as a sound current, amplifying and reproducing said current, scanning said control record with a beam of light having a height of the same order as the height of the perforations, exciting a photosensitive device with the light modulated by said control record to produce a control current, modifying the wave form of said control current to approximately sinusoidal form, amplifying and detecting said modified current and controlling the transmission of said sound current by the products of said detection.

WILFRID L. DAWSON.